US010069571B2

(12) United States Patent
Voois et al.

(10) Patent No.: US 10,069,571 B2
(45) Date of Patent: *Sep. 4, 2018

(54) COHERENT OPTICAL TRANSCEIVER WITH PROGRAMMABLE APPLICATION MODES

(71) Applicant: INPHI CORPORATION, Santa Clara, CA (US)

(72) Inventors: Paul Voois, Ladera Ranch, CA (US); Diego Ernesto Crivelli, Cordoba (AR); Ramiro Rogelio Lopez, Cordoba (AR); Jorge Manuel Finochietto, Cordoba (AR); Oscar Ernesto Agazzi, Irvine, CA (US); Nariman Yousefi, Dana Point, CA (US); Norman L. Swenson, Mountain View, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,898

(22) Filed: Oct. 30, 2017

(65) Prior Publication Data

US 2018/0069632 A1    Mar. 8, 2018

Related U.S. Application Data

(63) Continuation of application No. 14/743,660, filed on Jun. 18, 2015, now Pat. No. 9,838,131, which is a
(Continued)

(51) Int. Cl.
*H04B 10/04* (2006.01)
*H04B 10/00* (2013.01)
(Continued)

(52) U.S. Cl.
CPC ......... *H04B 10/40* (2013.01); *H04B 10/2507* (2013.01); *H04B 10/58* (2013.01)

(58) Field of Classification Search
None
See application file for complete search history.

(56) References Cited

U.S. PATENT DOCUMENTS

| 8,433,195 B2 * | 4/2013 | Biegert ............... H04L 12/2856 398/25 |
| 8,781,326 B2 * | 7/2014 | Hu ....................... H04B 10/548 398/140 |

(Continued)

OTHER PUBLICATIONS

Information Gatekeepers Inc., Fiber Optics Weekly Update. 2010, p. 6.
(Continued)

*Primary Examiner* — Ken N Vanderpuye
*Assistant Examiner* — Jai Lee
(74) *Attorney, Agent, or Firm* — Richard T. Ogawa; Ogawa P.C.

(57) ABSTRACT

Methods of operating an optical communication system in coherent optical transmissions for metro applications. Relative to conventional solutions, the optical communication system can be implemented with reduced cost and can operate with reduced power consumption, while maintaining high data rate performance (e.g., 100 G). Furthermore, a programmable transceiver enables compatibility with a range of different types of optical networks having varying performance and power tradeoffs. In one embodiment, the optical communication system uses 100 Gb/s dual-polarization 16-point quadrature amplitude modulation (DP-16QAM) with non-linear pre-compensation of Indium Phosphide (InP) optics for low power consumption.

20 Claims, 7 Drawing Sheets

Related U.S. Application Data continuation of application No. 13/655,302, filed on Oct. 18, 2012, now Pat. No. 9,071,364.

(60) Provisional application No. 61/548,675, filed on Oct. 18, 2011.

(51) Int. Cl.
  *H04B 10/12* (2006.01)
  *H04B 10/40* (2013.01)
  *H04B 10/2507* (2013.01)
  *H04B 10/58* (2013.01)

(56) References Cited

U.S. PATENT DOCUMENTS

| | | | |
|---|---|---|---|
| 9,025,651 B1* | 5/2015 | Dave | H04B 10/2569 |
| | | | 375/229 |
| 9,337,934 B1* | 5/2016 | Agazzi | H04B 10/61 |
| 2002/0122503 A1* | 9/2002 | Agazzi | H03M 1/0624 |
| | | | 375/316 |
| 2004/0033079 A1* | 2/2004 | Sheth | H04B 10/801 |
| | | | 398/135 |
| 2006/0062581 A1* | 3/2006 | Liu | H04B 10/2513 |
| | | | 398/183 |
| 2009/0196602 A1* | 8/2009 | Saunders | H04B 10/5053 |
| | | | 398/26 |
| 2010/0247099 A1* | 9/2010 | Lowery | H04B 10/2543 |
| | | | 398/79 |
| 2011/0293266 A1* | 12/2011 | Aoki | H04B 10/516 |
| | | | 398/25 |
| 2012/0076502 A1* | 3/2012 | Swanson | H04B 10/0795 |
| | | | 398/136 |
| 2012/0155890 A1* | 6/2012 | Zhou | H04B 10/6165 |
| | | | 398/208 |
| 2012/0243876 A1* | 9/2012 | Tang | H04L 27/2601 |
| | | | 398/135 |
| 2012/0321323 A1* | 12/2012 | Huang | H04B 10/5053 |
| | | | 398/185 |
| 2013/0108271 A1* | 5/2013 | Tang | H04L 7/0008 |
| | | | 398/66 |

OTHER PUBLICATIONS

Wei et al., Colourless adaptively modulated optical OFDM fransmitters using SOAs as intensity modulators, 2009, Optical Society of America, pp. 9012-9027.

Lach et al., Modulation formats for 100G and beyond, 2011, Elsevier Inc., Optical Fiber Technology, pp. 377-386.

Pfau, T. et al., "Hardware-Efficient Coherent Digital Receiver Concept with Feedforward Carrier Recovery for M-QAM Constellations," Journal of Lightwave Technology, Apr. 15, 2009, pp. 989-999, vol. 27, No. 8.

United States Office Action, U.S. Appl. No. 13/655,302, dated May 9, 2014, 41 pages.

* cited by examiner

COHERENT OPTICAL TRANSCEIVER WITH PROGRAMMABLE APPLICATION MODES

RELATED APPLICATIONS

The present application is a continuation of U.S. application Ser. No. 14/743,660 filed on Jun. 18, 2015, which is a continuation of U.S. application Ser. No. 13/655,302 filed on Oct. 18, 2012, now U.S. Pat. No. 9,071,364 published Jun. 30, 2015, which claims the benefit of U.S. Provisional Patent Application Ser. No. 61/548,675 filed on Oct. 18, 2011, the content of which are each incorporated by reference herein in their entirety.

BACKGROUND

1. Field of the Art

The disclosure relates generally to communication systems, and more specifically, to low power optical transmission.

2. Description of the Related Art

Worldwide demand for Internet bandwidth is growing rapidly each year, driven largely by video demand and the prevalence of mobile devices. 100 Gigabit Ethernet (100 GE) is quickly emerging in enterprise and datacenter environments, driving a need for 100 Gb/s router links between datacenters. As a result, service providers seek to deploy 100 Gb/s transmission technology on metro (40-1000 km) and long haul (>1000 km) optical networks.

Coherent transmission and direct detection represent two classes of modulation technologies that are commonly used for 100 G dense wavelength division multiplexing (DWDM) optical networks. In coherent transmission, the transmitter modulates both phase and amplitude of the optical carrier. In direct detection, the transmitter modulates only amplitude of the optical carrier while phase information is lost. Direct detection can be used for metro applications, but only with significant limitations using existing technology. For example, current 100 Gb/s direct detection systems utilize four wavelengths (each carrying 25 Gb/s data) instead of one as in coherent systems, utilize expensive optical dispersion compensation to achieve metro reaches, and are much more sensitive to impairments like chromatic dispersion, polarization mode dispersion, and optical amplifier noise than coherent systems. Coherent transmission is typically better suited for long haul networks, where maximizing fiber capacity is generally the most important feature. However, coherent networks are not traditionally used for metro applications due to the high cost and power consumption of traditional coherent transmission systems.

SUMMARY

In a first embodiment, an integrated circuit comprises a digital interface, a digital signal processor (DSP), and an analog front end. The digital interface receives digital data from a host. The DSP generates a modulated signal vector based on the digital data. The analog front end generates an analog signal vector based on the modulated signal vector. The analog front end outputs the analog signal vector to a coherent optical transceiver that generates optical signals for transmission over an optical channel. At least one of the DSP, the analog front end, and the digital interface are configurable in a plurality of different predefined application modes. For a given application mode, one or more programmable blocks of the DSP, the analog front end, and/or the digital interface are programmed according to a predefined configuration associated with the given application mode. For example, in one embodiment the plurality of different application modes comprises at least one of: (1) a 100 G ZR application mode; (2) a 100 G metro QAM application mode; (3) a 100 G metro QPSK application mode; (4) a 100 G regional application mode; and (5) a 40 G application mode.

In a second embodiment, an integrated circuit comprises an analog front end, a digital signal processor (DSP), and a digital interface. The analog front end receives an analog signal vector from a coherent optical receiver that represents an optical signal. The analog front end generates a digital signal vector based on the analog signal vector. The DSP generates a demodulated signal vector based on the digital signal vector. The digital interface transmits the digital signal vector to a host. At least one of the DSP, the analog front end, and the digital interface are configurable in a plurality of different predefined application modes. For a given application mode, one or more programmable blocks of the DSP, the analog front end, and/or the digital interface are programmed according to a predefined configuration associated with the given application mode. For example, in one embodiment the plurality of different application modes comprises at least one of: (1) a 100 G ZR application mode; (2) a 100 G metro QAM application mode; (3) a 100 G metro QPSK application mode; (4) a 100 G regional application mode; and (5) a 40 G application mode.

In a third embodiment, a transceiver comprising first and second digital interfaces, first and second analog front ends, a 16 quadrature amplitude modulation (16QAM) encoder and a 16QAM decoder. The first digital interface generates a first digital signal vector based on a first host signal received from a host. The 16 quadrature amplitude modulation (16QAM) encoder generates a first 16QAM signal vector based on the first digital signal vector received from the digital interface. The first analog front end generates a first analog signal vector based on the first 16QAM signal vector, and transmits the first analog signal vector to a coherent optical transceiver for transmission over an optical channel by the optical transceiver. A second analog front end receives a second analog signal vector from the coherent optical transceiver representing an optical signal communicated over the optical channel encoded based on 16QAM. The second analog front end generates a second 16QAM signal vector based on the second analog signal vector. The 16QAM decoder to demodulate the second 16QAM signal vector and generates a second digital signal vector. The second digital interface generates a second host signal for providing to the host.

In a fifth embodiment, an integrated optics module comprises an optical receiver, a digital receiver, an optical transmitter, a digital transmitter, and a register. The optical receiver receives a first optical signal from an optical channel and converts the first optical signal to a first analog signal vector. The digital receiver receives the first analog signal vector from the optical receiver and generates a first digital signal vector representing receive data of the optical signal. The digital transmitter receives a second digital signal vector representing transmit data to be transmitted over the optical channel and generates a second analog signal vector for providing to an optical transmitter. The optical transmitter receives the second analog signal vector and converts the second analog signal vector to a second optical signal for transmission over the optical channel. A register stores a configuration of the integrated optical module from a plurality of different predefined application modes. Each application mode configures the integrated optical module for communication with a particular type of optical network. For each of the different predefined application modes, programmable blocks of the digital receiver and the digital transmitter are programmed to a predefined configuration associated with the application mode. For example, in one embodiment the plurality of different application modes comprises at least one of: (1) a 100 G ZR application mode; (2) a 100 G metro QAM application mode; (3) a 100 G metro QPSK application mode; (4) a 100 G regional application mode; and (5) a 40 G application mode.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

Overview

An integrated coherent transceiver supports a plurality of programmable application modes to provide compatibility with different host board architectures, different network types, and desired performance/power tradeoffs. In different programmable modes, various processing blocks of the integrated coherent transceiver may be configured according to different operational parameters. Furthermore, different processing blocks may be enabled or disabled (e.g., bypassed) in different modes. The programmability of the integrated coherent transceiver enables the transceiver to target specific power/performance tradeoffs that may vary between different network applications. In one embodiment, the integrated coherent transceiver can support, for example, a variety of different host board architectures designed for use in networks of varying data rates, range, power requirements, communication standards, or other constraints.

Example Host Architecture

Figure 1:
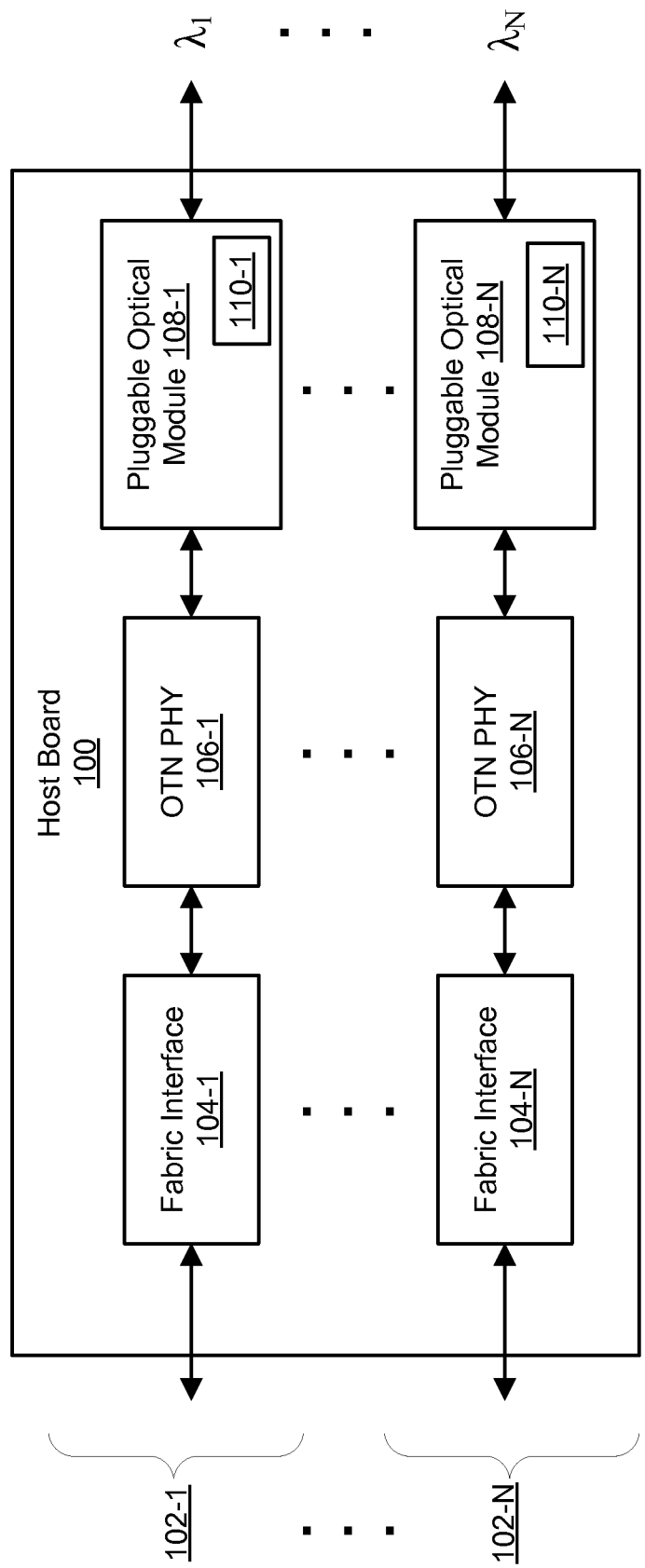
FIG. 1 is a block diagram of a first embodiment of a host board for optical communication.

FIG. 1 illustrates a block diagram of an embodiment of a packet optical transport platform (P-OTP) host board 100. The host board 100 comprises a plurality of channels 102-1, . . . 102-N, each corresponding to an optical wavelength. Each channel comprises a fabric interface 104, an optical transport network (OTN) physical layer processor (PHY) 106, and a pluggable optical module 108, which includes a transceiver 110. The host board 100 converts one or more client signals per channel onto optical wavelengths $\lambda_k$, k=1, . . . , N, for transmission over an optical network. The fabric interface 104 provides an interface to a platform fabric (switching, etc.) via a backplane connector. The OTN PHY 106 performs mapping (i.e., converting the client signal into a format that is suitable for optical transmission), framing (i.e., dividing the transmitted signal into discrete, regular groupings or frames), and forward error correction (FEC). The client signals may be, for example, 10 G/100 G Ethernet signals, OTU2/OTU3/OTU4 signals, OC-192 signals, or other signal types. In one embodiment, the OTN PHY 106 maps the client signals onto 40 G OTU3, or 100 G OTU4 wavelengths, although compatibility with other data rates is also possible. In another embodiment, the OTN PHY 106 is replaced by a network processor (NP), which processes exclusively Ethernet clients (for example, 1 GE and 10 GE clients) and converts these into 40 G Ethernet or 100 G Ethernet signals which are sent to the pluggable optical modules 108. The pluggable optical modules 108 provide optics and interfacing electronics for interfacing to an optical network (e.g., a dense wavelength division multiplexing (DWDM) optical network).

Figure 2:
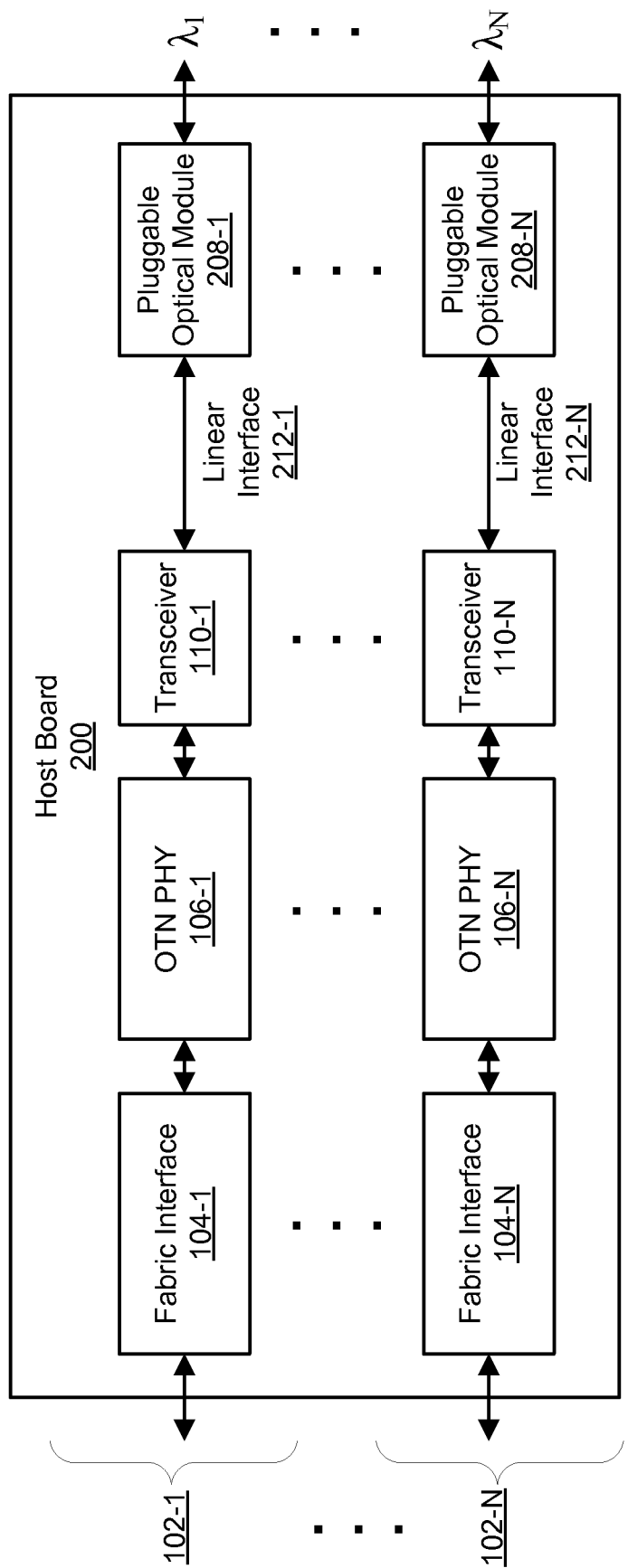
FIG. 2 is a block diagram of a second embodiment of a host board for optical communication.

FIG. 2 illustrates an alternative embodiment of a host board 200. The host board 200 is similar to the host board 100 described above except that the transceiver 110 resides on the host board 200 outside of the pluggable optical module 208 (which in contrast to optical module 108 of FIG. 1, lacks the transceiver 110). A linear analog interface 212 is included between the transceiver 110 and the optical module 208 to provide communication between the transceiver 110 and the pluggable optical module 208.

A benefit of the configuration of FIG. 2 is that it is simpler to dissipate power from the transceiver 110 when it is located on the host board 200, thus reducing cost and complexity of the optical modules 108, and simplifying the thermal management of the overall system. Furthermore, this approach potentially enables more ports per line card by reducing the footprint of the optical modules 108 and allowing more optical modules 108 to fit on a host board faceplate of a given size. On the other hand, this approach introduces bandwidth and other signal integrity impairments caused by the linear interface 212 and the electrical connector of the pluggable optical module 208. These impairments can be compensated by transmit pre-emphasis and receive equalization in the transceiver 110, as will be described subsequently.

As will be described below, transceiver 110 is programmable to enable compatibility with both the architecture of host board 100 and the architecture of host board 200. Thus, the host board designer is afforded flexibility in the host board architecture and may determine the design that best suits the particular network application.

Example Pluggable Optical Module Architecture

Figure 3A:
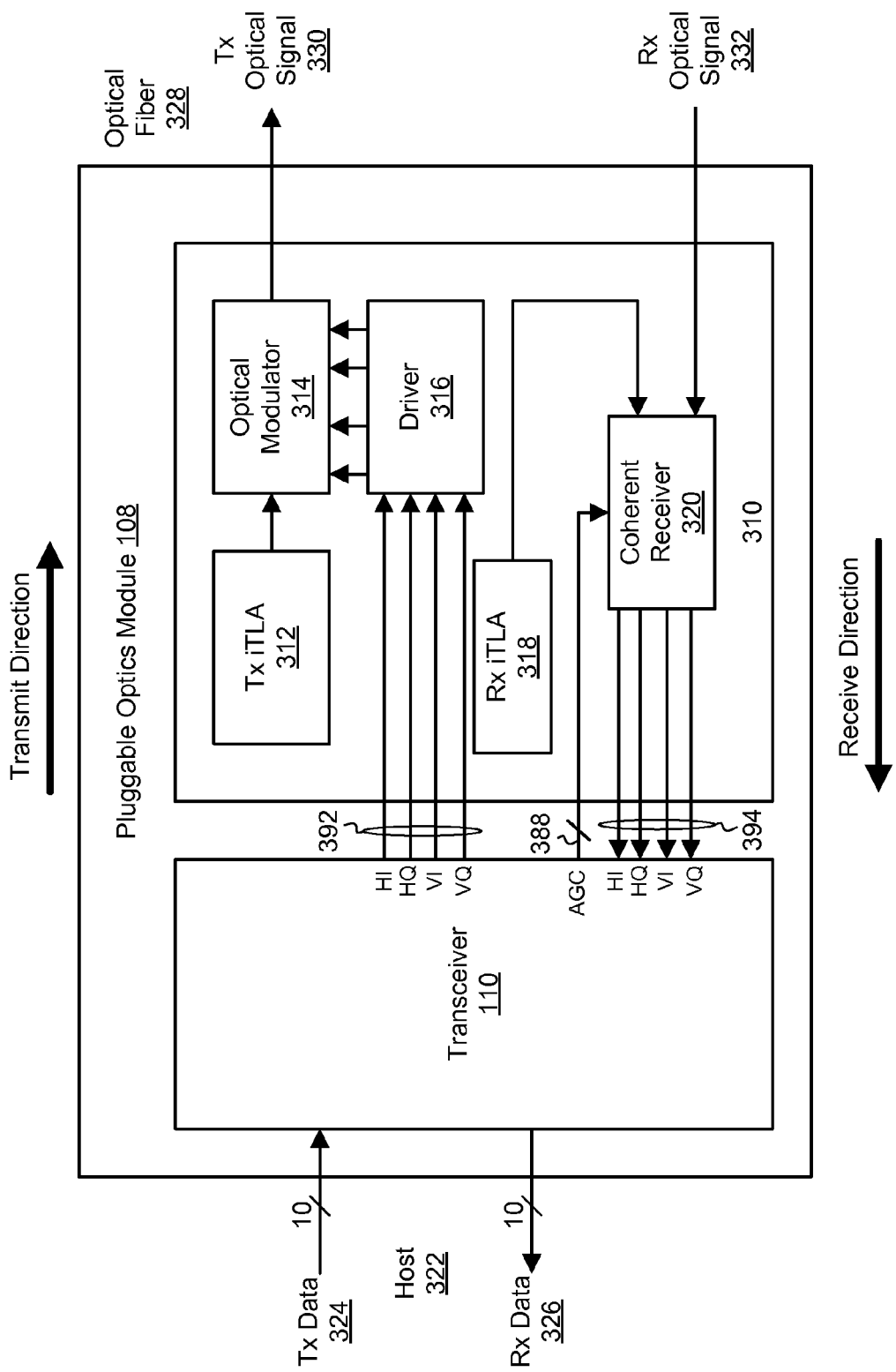
FIG. 3A is a block diagram of a first embodiment of a pluggable optical module for optical communication.

FIG. 3A illustrates a block diagram of an embodiment of an pluggable optical module 108 which includes the transceiver 110 and which may be used on a host board 100 having the architecture of FIG. 1. In the illustrated embodiment, the pluggable optical module 108 comprises the transceiver 110 and an optics block 310 which comprises a transmit integrated tunable laser assembly (Tx iTLA) 312, a receive integrated tunable laser assembly (Rx iTLA) 318, an optical modulator 314, a driver 316, and a coherent receiver 320. Alternative embodiments may include different or additional components.

The pluggable optical module 108 receives transmit (Tx) data 324 (e.g., a digital electrical signal) from the host 322 (e.g., a component on the host board 100), processes the data 324, and generates a transmit (Tx) optical signal 330 for transmission over an optical fiber 328. Furthermore, the pluggable optical module 108 receives a receive (Rx) optical signal 332 from the optical fiber 328, processes the signal 332, and generates receive (Rx) data 326 (e.g., a digital electrical signal) provided to the host 322. In one embodiment, the pluggable optical module 108 is configured for communicating over an optical fiber 228 based on Indium Phosphide (InP) modulator technology. Alternatively, other technologies such as Lithium Niobate (LiNb) modulator technology may be used.

The transceiver 110 of the pluggable optical module 108 may be programmable for compatibility with host signals conforming to various standards such as, for example, 100 GE, OTU4, OTU3, or other interfacing standards. For example, in one application mode the transceiver 110, the transceiver includes an interface that enables it to communicate directly with an Ethernet switch. Furthermore, the transceiver 110 of the pluggable optical module 108 may be programmable for compatibility with host signals with various data rates, error correction schemes, etc. The transceiver 110 of the pluggable optical module 108 has internal mapping and framing capability to translate the host interface protocol (for example, 100 GE) to the optical transmission protocol (for example, OTU4). The programmability of the transceiver 110 enables a pluggable optical module 108 that is compatible with a wide variety of host architectures that can be used in different types of optical networks.

In the transmit path of the pluggable optical module 108, the transceiver 110 modulates Tx data 324 received from the host 322 onto a signal vector (e.g., four signals) 392 representing quadrature (I/Q) components for each of horizontal (H) and vertical (V) polarizations. These signals 392 are represented as HI, HQ, VI, and VQ. In the receive path, the transceiver 110 receives a signal vector (e.g., four signals) 394 represented as HI, HQ, VI, VQ from the coherent receiver 320 and performs signal processing functions such as, for example, equalization, timing recovery, and/or demodulation in order to generate Rx data 326. In one embodiment, the transceiver 110 may furthermore perform additional framing and error correction functions which may adjust the line rate from that used by the host 322.

In the optics block 310, the Tx iTLA generates an optical carrier signal and provides the optical carrier signal to the optical modulator 314. The driver 316 operates in combination with the optical modulator 314 to modulate the HI/HQ and VI/VQ signals onto optical carriers in horizontal and vertical polarizations respectively for transmission over the optical fiber 328. In the receive direction, the Rx iTLA 318 generates a local oscillator (LO) signal at approximately the carrier frequency of the received optical signal 332. The coherent receiver 320 receives the LO signal from the Rx iTLA 318 and demodulates the incoming optical signal 332 to baseband HI, HQ, VI, VQ signals 394 which are provided to the transceiver 110 for processing as described above.

In one embodiment, the transceiver 110 also provides a feedback signal 388 for automatic gain control (AGC) to the coherent receiver 320 based on the strength of the received signal vector 394. The AGC signal 388 may comprise a single signal or multiple signals (e.g., each corresponding to an individual signal in the received signal vector 394).

Figure 3B:
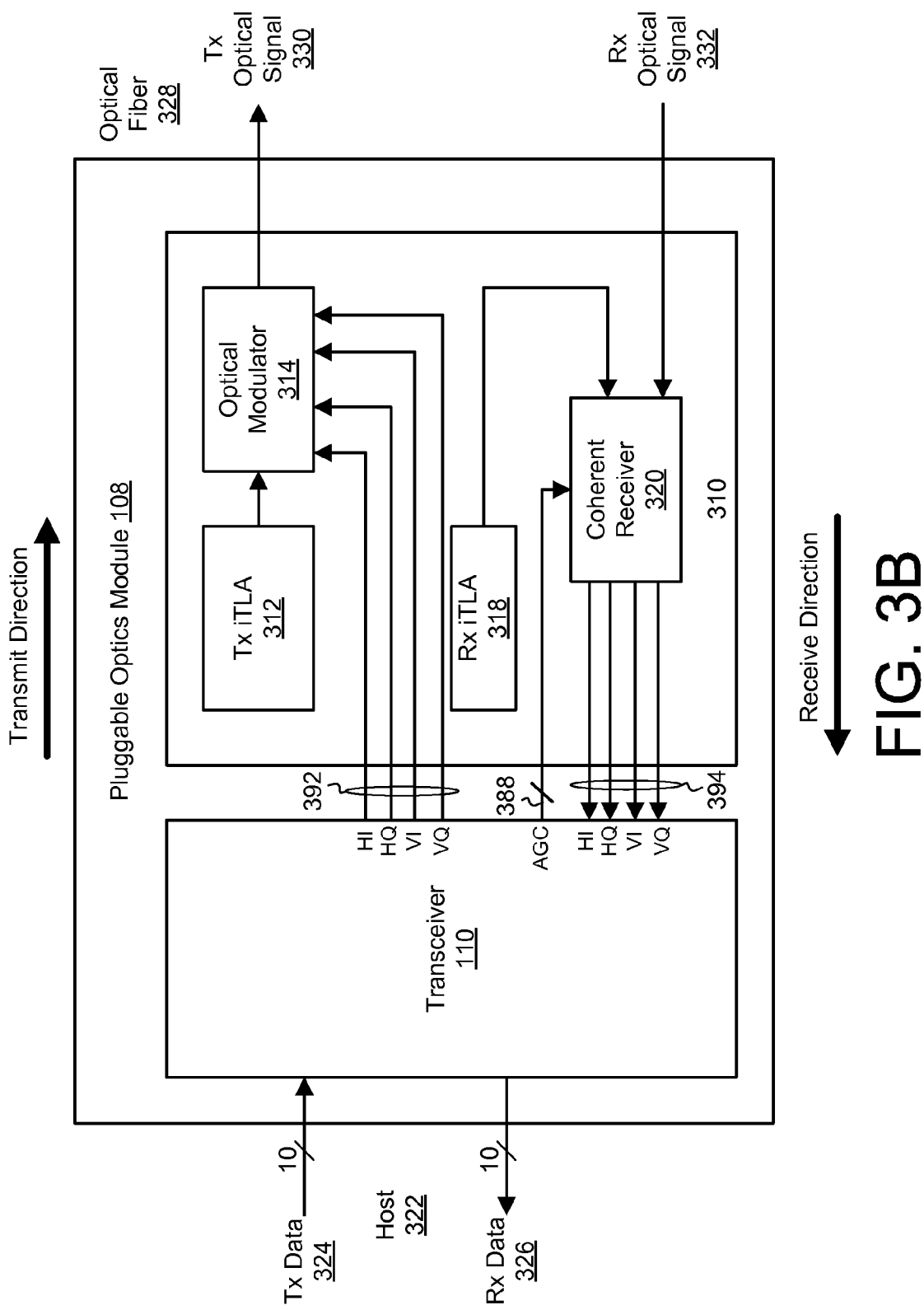
FIG. 3B is a block diagram of a second embodiment of a pluggable optical module for optical communication.

FIG. 3B illustrates an alternative embodiment of a pluggable optical module 108 which includes a transceiver 110 and which may be used on a host board 100 having the architecture of FIG. 1. The pluggable optical module 108 of FIG. 3B is similar to the pluggable optical module 108 of FIG. 3A, but lacks the driver 316. Instead, transmitted signals 392 (e.g., HI, HQ, VI, VQ) from the transceiver 110 are provided directly to the optical modulator 314. Without the driver 316, optical modulator 314 is driven at a lower voltage and provides a reduced optical output power. A benefit of the architecture of FIG. 3B is that it provides reduced electrical power dissipation (due to the elimination of the driver 316) and improves the capability of the transceiver 110 to compensate for the non-linearity of the transfer function of the modulator 314 (due to the direct connection of the transceiver 110 to the modulator 314). The programmability of the transceiver 110 enables the transceiver to be compatible with pluggable optical modules 108 having either the architecture of FIG. 3A or FIG. 3B.

A challenge of implementing the driver-less architecture of FIG. 3B is that in current technology, the output voltage capability of a CMOS digital-to-analog converter (DAC) (which provides output signals 392 (HI, HQ, VI, VQ) in the transceiver 110) is not well matched to the input drive voltage of an optical modulator 314. For example, a typical 28 nm CMOS DAC generates a differential signal of approximately 1V peak to peak differential (1 Vppd), or equivalently 500 mV peak to peak single ended (500 mVpps). (A differential signal is equivalent to two single ended signals of equal and opposite voltage.) On the other hand, a typical lithium niobate (LiNb) modulator has an input drive voltage requirement of 5-7 Vpps, around 10 times the capability of CMOS. (A fundamental parameter of the modulator 314 is $V_\pi$, which is defined in standard terminology as the input drive voltage required to shift the phase of the modulator optical output by 180°. In normal operation the modulator is driven at a full swing of $2V_\pi$.) The transceiver 110 and optical module 108 architectures described herein solve this challenge in multiple ways. First, the transceiver 110 uses (in certain configurations) DP-16QAM modulation and electrical pre-emphasis, which lower the bandwidth required for 100 Gb/s transmission to below 10 GHz (compared to 20 GHz for DP-QPSK), which in turn enables a 50% reduction in $V_\pi$ of the optical modulator 314 (since modulator $V_\pi$ is approximately linearly proportional to modulator bandwidth for a given technology.) Second, in embodiments where the transceiver 110 uses non-linear pre-compensation, the use of modulator technologies with lower $V_\pi$ but with higher non-linearity is enabled. Third, the optical module 108 uses Indium Phosphide (InP), silicon photonics, or other compact, low power optical modulator technologies in some embodiments, which inherently have lower $V_\pi$ than LiNb. Finally, the transceiver 110 and the optical components in the optical module 108 may be copackaged via interconnect technology such as silicon interposer, package on package, or through-silicon via. The advantage of such a configuration is that the CMOS DAC output from the transceiver 110 does not need to have a 50 Ω termination, but instead can drive the modulator load directly. In a traditional configuration with separate packages, both the DAC output and the modulator input would have 50Ω terminations, resulting in an effective load seen by the DAC of 25Ω. Therefore the copackaging approach results in a doubling of output voltage swing for a given current. (This follows from Ohm's Law V=I×R.) Combining these techniques, the optical module architecture of FIG. 3B can be implemented with a CMOS DAC output drive voltage of, for example, approximately 2 Vppd and a modulator $V_\pi$ of, for example, approximately 2 Vppd. This still results in the DAC driving the modulator at half its full swing (since the modulator full swing is $2V\pi$), but the impact of such underdrive is a reduction of approximately 3 dB in optical output power. The output power reduction may be compensated by external amplification, or simply absorbed into the link budget of the optical network.

Example Transceiver Architecture

Figure 4:
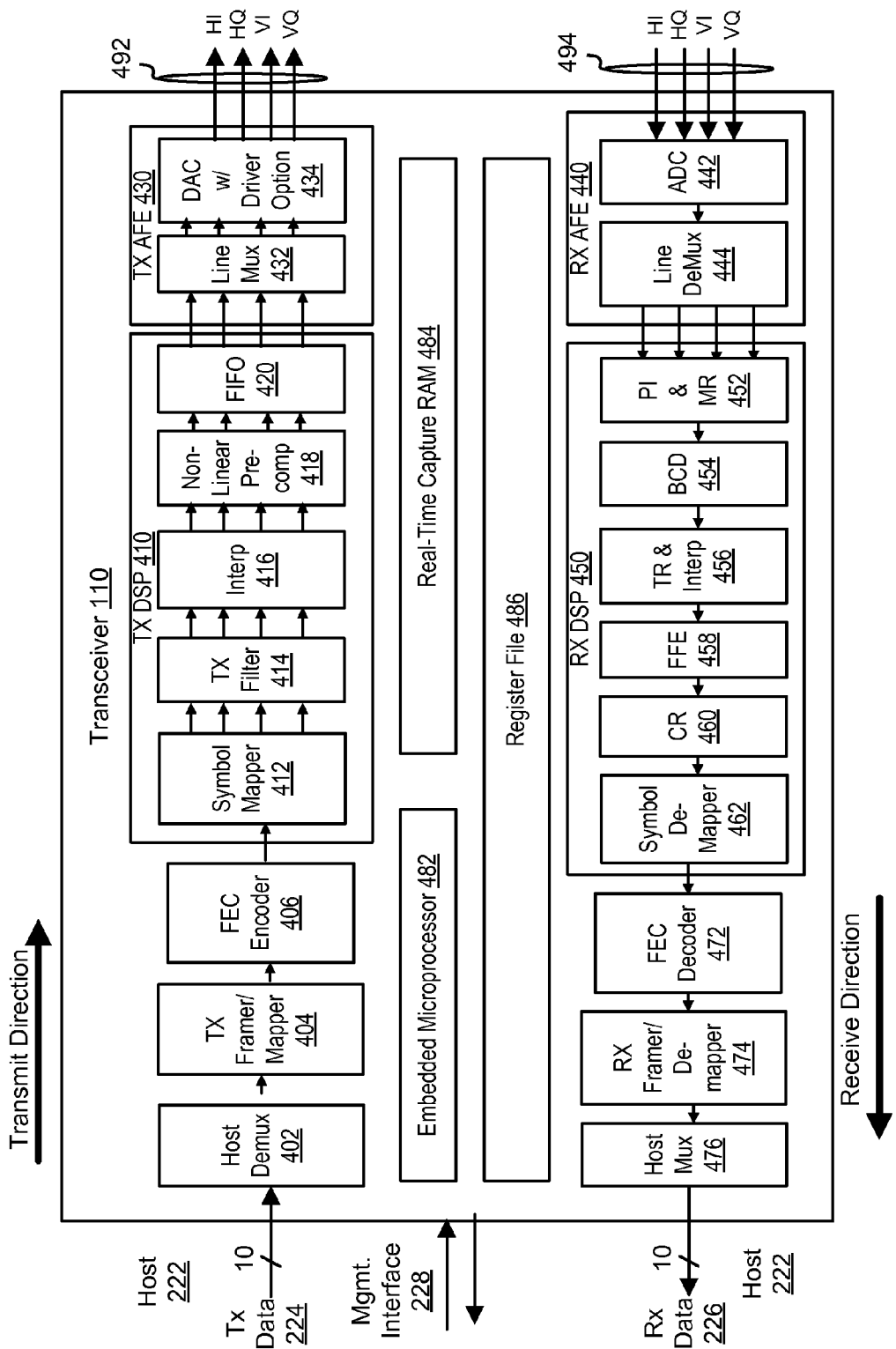
FIG. 4 is a block diagram of an embodiment of a programmable transceiver suitable for an optical communication system.

FIG. 4 illustrates an embodiment of the transceiver 110. In a transmit direction, the transceiver 110 receives digital data signals 224 from a host 222 and processes the received data to provide analog output signals 492 suitable for conversion to optical output signals for transmission over an optical network. In a receive direction, the transceiver 110 receives analog input signals 494 converted from optical signals received over the optical network, and processes the analog input signals 494 to recover the digital data signals 226.

In the transmit direction of the transceiver 110, a host demultiplexer (demux) 402 receives the data signals 224 from the host 222 over a plurality of input channels (e.g., 10 channels). The host demultiplexer 402 recovers the clocks from and demultiplexes the data signals 224 and may also perform various processing functions such as, for example, equalization, signal integrity monitoring and skew compensation. The host demultiplexer 402 may be programmable to operate in accordance with a number of different interfacing standards such as, for example, CAUI (for 100 GE data), OTL4.10 (for OTU4 data), OTL3.4 (for OTU3 data), and other communication protocols.

The transmit (Tx) framer/mapper 404 receives the demultiplexed data from the host demultiplexer 402 and performs framing/mapping of the data according to a programmable framing/mapping protocol. In one embodiment, the Tx framer/mapper 404 strips off error correction bytes that may be present in the data signals 224 when used with certain host board architectures. The FEC encoder 406 then adds error correction bytes according to a forward error correction (FEC) scheme suitable for a particular optical network. In various programmable modes, the FEC encoder 406 may be configured as, for example, a standard G.709 FEC encoder (e.g., 6 dB coding gain, 7% overhead GFEC), a soft-decision (SD) FEC encoder (e.g., 11.3 dB coding gain, 20% overhead, low density parity check SD FEC), a hard-decision (HD) FEC encoder (e.g., 8 dB coding gain, 7% overhead HD FEC) or other encoder type. Furthermore, in some modes, the FEC encoder 406 may be bypassed, in which case the error correction provided by an external FEC device such as the OTN PHY 106 in FIGS. 1-2 is retained.

The encoded data is then passed to the transmit (Tx) digital signal processor (DSP) 410 for processing. Generally, the Tx DSP 410 performs encoding and/or filtering of the signal to prepare it for transmission over the optical network. For example, in one embodiment, the Tx DSP 410 comprises a symbol mapper 412, a transmit filter 414, an interpolation filter 416, a non-linear pre-compensation filter 418, and a first in, first out (FIFO) memory 420. In different modes of operation, the blocks of the Tx DSP 410 may be configured according to different operational parameters and/or one or more of the blocks may be bypassed.

The symbol mapper 412 encodes received data words according to a programmable constellation mapping. For example, in various embodiments, the symbol mapper 412 may apply encoding for dual-polarization quadrature phase shift keying (DP-QPSK) modulation (e.g., 40 G or 100 G DP-QPSK), encoding for dual-polarization binary phase shift keying (DP-BPSK) modulation (e.g., 40 G DP-BPSK), encoding for dual-polarization quadrature amplitude modulation (DP-QAM) encoding such as DP-16QAM (e.g., 100 G or 200 G DP-16QAM), or other encoding scheme. In alternative embodiments, single polarization and/or differential encoding schemes may be used. In one embodiment, the symbol mapper 412 generates encoded symbols for dual-polarization 16QAM represented by four channels (in phase (I) and quadrature (Q) for each of horizontal (H) and vertical (V) polarization) of two bits each, for a total of 8 bits per DP-16QAM symbol.

The transmit filter 414 applies one or more programmable filters which may include, for example, one or more time domain filters, one or more frequency domain filters, or one or more dual implementation filters. The transmit filter may furthermore implement, for example, a bulk chromatic dispersion pre-compensation filter, an electrical pre-emphasis filter, a skew compensation filter, or a combination of filters. Different filter parameters may be used in different operational modes (and/or some filters may be bypassed). For example, when the transceiver 110 is configured for use outside the pluggable optical module 208 as in the configuration of FIG. 2, the electrical pre-emphasis filter may be used to compensate for bandwidth impairments in the electrical channel (e.g., linear interface 212) between the transceiver 110 and the optical module 208 as well as in the optical components themselves. Alternatively, when the transceiver 110 is integrated with the optical module 108 in the configuration of FIG. 1, the electrical pre-emphasis filter may be bypassed (or different filter parameters may be used).

The interpolation filter 416 affects a clock domain crossing between the symbol clock and the Tx DAC clock, which are not necessarily synchronous. (Though in a typical embodiment, the Tx DAC samples at approximately twice the symbol rate.) The non-linear pre-compensation filter 418 compensates for non-linearities in the electrical and optical channels (including electronic components, electrical paths, and optical devices) to ensure evenly spaced points in the optical constellation. For example, in one embodiment the non-linear pre-compensation block 418 applies a lookup table that implements the inverse of the non-linear transfer function of the optics, so that the combination of the non-linear pre-compensation block 418 and the optics is approximately linear. The lookup table may be programmable or adaptive. In one embodiment, an adaptive lookup table is used that receives feedback from the optical output of the optical modulator 316. This embodiment may be implemented, for example, using a low-bandwidth photo-detector and trans-impedance amplifier which returns a monitor signal to the transceiver 110 via a low-speed ADC (which may be included in the transceiver 110). The transceiver 110 can then use an adaptive algorithm such as least mean squared (LMS) to update the lookup table. The non-linear pre-compensation block 418 may be particularly useful in modes that are susceptible to non-linear distortions such as modes using 16QAM modulation as will be described below. In other modes (such as those using DP-QPSK modulation), the non-linear pre-compensation block 418 may be bypassed (or may be configured with different filter parameters).

The FIFO 420 queues blocks of samples that are processed in a parallel manner by the interpolation filter 416 and non-linear pre-compensation filter 418, and feeds these samples to the Tx AFE 430 sample by sample.

The transmit analog front end (Tx AFE) 430 receives the 4-channel signal vectors from the Tx DSP 410, and generates the analog signals 492 (HI, HQ, VI, VQ). In one embodiment, the Tx AFE 430 comprises a line multiplexer (mux) 432 and a digital-to-analog converter (DAC) (with driver option) 434 which collectively operate to produce the analog signals 492 from the digital symbols. The DAC 434 may be programmable to provide outputs of varying resolution depending on the operating mode of the transceiver 110. For example, for operation with DP-QPSK or DP-BPSK modulation, the DAC 434 may be configured to operate as a driver that outputs one of two voltage levels (e.g., logic high or logic low). For operation with 16QAM modulation, the DAC 434 may be configured to operate a 2-bit DAC capable of producing four different voltage levels. When the Tx filter 414 interpolation filter 416, and/or non-linear pre-compensation 418 blocks are enabled, the DAC 434 may operate with a higher fixed point resolution, in order to accurately represent the adjusted signal values generated by these blocks. The DAC 434 may furthermore operate according to different programmable sample rates in different application modes (e.g., 32 GSa/s for DP-16QAM, 64 GSa/s for DP-QPSK, at 128 Gb/s line rate where GSa/s refers to giga-samples per second.)

In the receive direction of the transceiver 110, a receive (Rx) analog front end 440 receives analog signals 494 (HI, HQ, VI, VQ) and generates a digital representation of the signals for processing by a receive digital signal processor (Rx DSP) 450. In one embodiment, the Rx AFE 440 comprises an analog-to-digital converter (ADC) 442 and a line demultiplexer 444. The ADC 442 converts the analog signals 494 to digital representations. The ADC 442 may be programmable to operate with different resolutions and/or different programmable data rates (e.g., 32 GSa/s for DP-16QAM, 64 GSa/s for DP-QPSK, at 128 Gb/s line rate). The demultiplexer 444 parallelizes the data for processing by the Rx DSP 450. For example, in one embodiment, the demultiplexer 450 converts the ADC output from a 64 GHz, 6 bit vector to a 500 MHz, 768 bit vector and provides this data to the Rx DSP 450.

The Rx DSP 450 processes the digital representation to perform filtering, clock recovery and decoding operations useful for recovering data from the received signals. For example, in one embodiment, the Rx DSP 450 comprises a phase interpolation and matrix rotator (PI & MR) block 452, a bulk chromatic dispersion compensator (BCD) 454, a timing recovery (TR) and interpolation block 456, a feed-forward equalizer (FFE) 458, a carrier recovery (CR) block 460, and a symbol de-mapper 462. In different modes of operation, the blocks of the Rx DSPb 450 may be configured according to different operational parameters and/or one or more of the blocks may be bypassed.

The phase interpolation and matrix rotator block 452, also called an orthonormalization block, corrects for skew between I and Q components and corrects for difference in amplitude between I and Q components. The matrix rotator portion further maps input HI, HQ, VI, VQ to output HI', HQ', VI', VQ' in the DSP 450.

Figure 5:
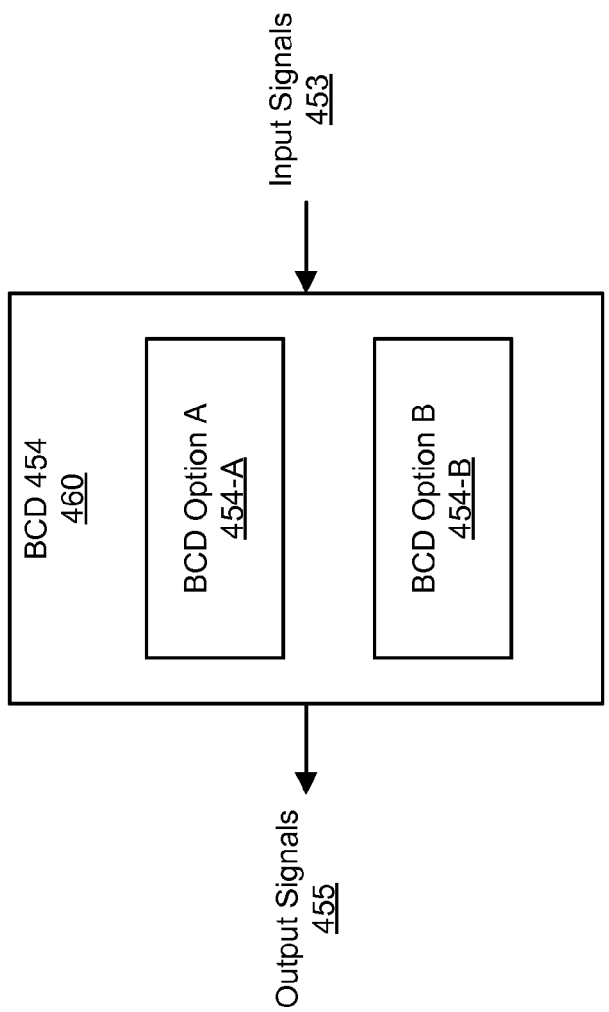
FIG. 5 is a block diagram of an embodiment of a bulk chromatic dispersion block for a transceiver.

The BCD 454 filters the incoming signals to compensate for chromatic dispersion in the optical channel. The compensation capability of the BCD 454 may be programmable according to different operational modes. For example, in different operational modes, the BCD 454 may apply up to 2 ns/nm compensation (resulting in lower power dissipation), up to 55 ns/nm compensation (resulting in higher power dissipation), or the BCD 454 may be bypassed (resulting in little or no power dissipation). In the case of 2 ns/nm or 55 ns/nm capability, the BCD 454 can automatically adapt to any amount of chromatic dispersion (which is generally a function of fiber length) up to the 2 ns/nm or 55 ns/nm respectively. In other embodiments, modes may be available that use different programmable compensation parameters. FIG. 5 illustrates an embodiment of the BCD 454 with selectable compensation, having input signals 453 and output signals 455. This embodiment comprises two options; in alternative embodiments, the BCD 454 may comprise more than two options. In the example cited above, the BCD Option A 454-A compensates up to 55 ns/nm and the BCD Option B 454-B compensates up to 2 ns/nm. The BCD 454 may be configured to use either Option A 454-A or Option B 454-B, or it may be configured to bypass both options to provide no compensation. In the example, when the BCD Option A 454-A is used, the BCD Option B 454-B is powered down; when the BCD Option B 454-B is used, the BCD Option A 454-A is powered down. Typically, the BCD Option A 454-A dissipates higher power than the BCD Option B 454-B, and BCD Option B 454-B dissipates higher power than the configuration that bypasses both options.

The timing recovery and interpolation block 456 estimates the frequency and phase of the received data signal and generates timing information used to recover the data. The interpolation capability enables an all-digital implementation of the timing recovery function in which the value of the received data signal at the correct sampling phase is interpolated, as opposed to having to adapt the sampling phase and frequency of the Rx AFE 440 to the timing of the incoming data signal.

The FFE 458 filters the data in order to apply an equalization that compensates for intersymbol interference (ISI) effects imposed by the optical and electrical channels. In particular, the ISI may be caused by: residual chromatic dispersion that is not compensated by the BCD 454 (either because the BCD 454 is bypassed or because its adaptation to the chromatic dispersion in the fiber is not exact), polarization mode dispersion, and bandwidth effects caused by the electrical channel (including connectors) between the coherent receiver 320 and the transceiver 110. In different programmable modes, the FFE 458 may apply a filter having, for example, 4 taps, 8 taps, 12 taps, 16 taps, 20 taps, 24 taps, or some other filter length. In the case where the FFE 458 is programmed to use less than its total number of taps, the unused taps may be shut down or clock gated to save power.

The carrier recovery block 460 receives FFE samples from the FFE 458 and applies a phase domain, decision directed phase locked loop (PLL) to estimate and compensate for the frequency and phase differences between the transmitted signal carrier (after propagation through the fiber) and the local oscillator. The carrier recovery block 460 further applies a phase noise estimation algorithm to compensate for phase noise in the FFE samples, which may be caused by, for example, nonzero laser linewidth in the transmit laser and/or local oscillator, or by fiber nonlinearities. Finally, the carrier recovery block 460 slices the frequency/phase compensated FFE samples and provides decisions to the symbol de-mapper 462.

In example embodiments, the phase noise estimation in the carrier recovery block 460 uses either a Viterbi-Viterbi carrier recover (VV-CR) algorithm or blind phase search (BPS-CR) algorithm. In another embodiment, carrier recovery block 460 may be configured to provide both VV-CR and BPS-CR algorithms and to select from among the two algorithms depending on the application mode of the transceiver 110. When large laser phase noise is present in the FFE samples, the BPS-CR algorithm generally provides superior noise performance. For example, in one embodiment, a BPS-CR algorithm is applied when the DSP 450 is configured for DP-16QAM demodulation. DP-16QAM demodulation is particularly sensitive to laser linewidth (LW), which degrades the performance of DP-16QAM when it is used in conjunction with low-power, low-cost integrated InP lasers (either in the transmitter or local oscillator, or both), which tend to have higher LW (e.g. 500 kHz instead of 100 kHz typical for lithium niobate lasers). The noise performance of the BPS-CR algorithm enables the transceiver 110 to operate using DP-16QAM despite the sensitivity to laser LW. Thus, the described architecture solves the laser LW problem traditionally associated with 16QAM operation. Examples of BPS-CR algorithms are described in: Pfau, T.; Hoffmann, S.; Noe, R.; "Hardware-Efficient Coherent Digital Receiver Concept with Feedforward Carrier Recovery for M-QAM Constellations," Lightwave Technology, Journal of, vol. 27, no. 8, pp. 989-999, Apr. 15, 2009.

Referring back to FIG. 4, the symbol de-mapper 462 decodes the received symbol according to the programmed modulation scheme. For example, the symbol de-mapper 462 may be programmable to decode according to dual-polarization quadrature phase shift keying (DP-QPSK) demodulation (e.g., 40 G or 100 G DP-QPSK), dual-polarization binary phase shift keying (DP-BPSK) demodulation (e.g., 40 G DP-BPSK), dual-phase quadrature amplitude modulation (DP-QAM) demodulation such as DP-16QAM (e.g., 100 G or 200 G DP-16QAM) demodulation, or other demodulation scheme. In alternative embodiments, decoding for single polarization and/or differential demodulation schemes may be used.

The Rx DSP 450 then passes the demodulated data to the FEC decoder 472 which performs error correction. In various programmable modes, the FEC decoder 472 may be configured as, for example, a standard G.709 FEC decoder (e.g., 6 dB coding gain, 7% overhead GFEC), a soft-decision (SD) FEC decoder (e.g., 11.3 dB coding gain, 20% overhead, low density parity check SD FEC), a hard-decision (HD) FEC decoder (e.g., 8 dB coding gain, 7% overhead HD FEC), or other decoder type. Furthermore, in some modes, the FEC decoder 472 may be bypassed, in which case the error correction provided by an external FEC device such as the OTN PHY 106 in FIGS. 1-2 is retained.

The FEC decoder 472 provides the data to the Rx framer/de-mapper 474, which performs framing/de-mapping of the data according to a programmable framing/mapping protocol. In one embodiment, the framer/de-mapper 474 adds error correction using an FEC scheme that corresponds to the error correction scheme used by the host 222 (e.g., standard G.709 FEC or other error correction code scheme). The host multiplexer 476 multiplexes the data according to the communication protocol used by the host 222. In different modes, the multiplexer 476 may be programmable to operate in accordance with a number of different interfacing standards such as, for example, CAUI (for 100 GE data), OTL4.10 (for OTU4 data), OTL3.4 (for OTU3 data), and other communication protocols.

The embedded microprocessor 482, real-time capture random access memory (RAM) 484, and register file 486 perform various management and control functions and may interface to the host 222 via the management interface 228. For example, in one embodiment, the embedded microprocessor 482 may be used to upgrade or enhance the algorithms applied by the Tx DSP 410 and/or Rx DSP 450, after the transceiver 110 has been shipped into the field. In another embodiment, the embedded microprocessor 482 may be used to estimate parameters of the optical channel (such as fiber length, polarization mode dispersion, or optical SNR) and provide such channel monitoring information to the host 222 in real time. In yet another embodiment, the embedded microprocessor 482 may be used to perform built in self-test (BIST) in the transceiver 110 as part of the manufacturing process; for example, by cycling through various modes of operation of the transceiver 110 while the transceiver 110 is connected in a line loopback configuration, wherein the line TX interface 492 is directly connected to the line RX interface 494 on the same configured transceiver 110.

In one embodiment, the transceiver 110 is implemented as an application specific integrated circuit (ASIC). Furthermore, portions of the transceiver 110 (e.g., the functional blocks of the digital signal processor) may be implemented as a processor and a non-transitory computer-readable storage medium that stores computer-executable instructions. During operation, the processor loads and executes the instructions to carry out the functions described herein. Other functional blocks of the transceiver 110 may be implemented in hardware, firmware, or a combination of software, hardware, and/or firmware.

In an alternative embodiment, the transmit path of the transceiver 110 described above (and relevant management blocks) may be implemented as a standalone transmitter that does not necessarily have a receiver integrated in the same device. Furthermore, in another alternative embodiment, the receive path of the transceiver 110 described above (and relevant management blocks) may be implemented as a standalone receiver that does not necessarily have a transmitter integrated in the same device.

Example Programmable Application Modes

As described above, various components of the transceiver 110 may be programmable to enable the transceiver 110 to be compatible with a variety of applications. In one embodiment, a plurality of application modes are available. In different application modes, the transceiver 110 configures each of the functional blocks according to a predefined configuration and/or or bypasses one or more function blocks in accordance with the application mode. The programmability of the transceiver 110 enables a single pluggable optical module 108 containing the transceiver 110 to support all these application modes in a power-effective manner. For example, the pluggable optical module 108 may adhere to the CFP form factor, which is an industry standard widely used for short-reach (up to 10 km) 100 G Ethernet optical connections, but currently not used for longer reach (100s or 1000s of km) 100 G connections (including DWDM connections) because of its limited power budget. A network designer may easily plug a module 108 containing the transceiver 110 into a host board design and then set the transceiver 110 to the appropriate mode for the desired application.

Table 1 below provides an example set of application modes and their respective configurations for some sample applications. As illustrated, the transceiver 110 can be used for a variety of metro and regional applications having various reaches and power standards. Furthermore, the transceiver 110 can be configured for compatibility with host boards using different interfaces and communication protocols. The table is for exemplary purposes only and in alternative embodiments, different or additional operational modes may be available with different configuration settings.

TABLE 1

| Application | Reach (km) | Modulation | Host IF | BCD | FFE Taps | FEC | ADC/DAC | Device Power | CFP Power |
|---|---|---|---|---|---|---|---|---|---|
| 100GE ZR | 80 | 100 G QAM | 100GE | Bypass | 8 | 8 dB HDFEC | 32 G | 14 W | 24 W |
| Metro Green | 600 | 100 G QAM | OTU4/100GE | 2 ns/nm | 8 | Bypass | 32 G | 18 W | 28 W |
| Metro Brown | 600 | 100 G QPSK | OTU4/100GE | 2 ns/nm | 8 | Bypass | 64 G | 22 W | 32 W |
| Regional | 1500 | 100G QPSK | OTU4/100GE | 55 ns/nm | 12 | Bypass | 64 G | 26 W | 36 W |
| 40 G | 1500 | 40 G QPSK | OTU3 | 55 ns/nm | 12 | Bypass | 32 G | 18 W | 28 W |

In Table 1, the "Application" column describes various network types that give rise to these example transceiver 110 configurations. "100 GE ZR" refers to a point-to-point 100 G Ethernet connection of up to 80 km over unamplified, single-wavelength (non-DWDM) fiber. "Metro Green" refers to a metro DWDM greenfield network with connections up to 600 km, without optical dispersion compensation and without legacy 10 G wavelengths. This type of network is ideally suited to 16QAM modulation. "Metro Brown" refers to a metro DWDM brownfield network with connections up to 600 km, with optical dispersion compensation and with legacy 10 G wavelengths; while the optical dispersion compensation reduces the amount of chromatic dispersion for which the transceiver 110 compensates, the 10 G wavelengths introduce non-linear distortion that benefits from higher performance of QPSK modulation. "Regional" refers to a regional (i.e. having reach between metro and long haul) DWDM network up to 1500 km, where the longer reach also requires the higher performance of QPSK modulation. "40 G" refers to a 40 G network having a reach up to 1500 km. As used in Table 1 and the description herein "100 G" and "40 G" refer to technologies compatible with 100 G and 40 G networks respectively as these terms are understood by those ordinary skill in the art and do not necessarily require technologies having data rates of precisely 100 G or 40 G respectively.

In Table 1, the "Device Power" column shows representative power dissipation for particular example implementations of the transceiver 110 in 28 nm CMOS technology, and reflects the relative impact on power of the various combinations of modes and features for each application. The "CFP Power" column shows representative power dissipation for an example implementation of a pluggable optical module 108 (e.g., a CFP module) that contains the transceiver 110 as well as compact optical components in, for example, indium phosphide or silicon photonics technology. The CFP power budget is typically 24 W (in the case of 100 GE ZR) or 32 W, depending on the application, though certain host board designs may use advanced thermal management techniques to extend this budget to, for example, 40 W. The power metrics provided herein are for exemplary purposes only, and it should be understood that various implementations of the transceiver 110 and/or optical module 108 may achieve power metrics entirely different from those provided. Therefore, the power figures do not limit the scope of invention to any particular output powers or power ranges.

The various application modes described above with reference to Table 1 can also apply to a host board architecture that achieves the programmability discussed above by utilizing a programmable transceiver such as the transceiver 110. For example, in one embodiment, a host board 100 (in which a transceiver 110 is integrated with an optical module 108) having the configuration of FIG. 1 is programmable to achieve the various application modes described above with reference to Table 1. In a second embodiment, a host board 200 having the configuration of FIG. 2 (in which a transceiver 110 is external to an optical module 208) is programmable to achieve the various application modes described above.

Example Operational Modes

This section describes in detail two example modes in order to show how the flexibility of the transceiver 110 enables multiple applications and achieves low power targets in a programmable fashion. Particularly, the section describes and compares an example 100 GE ZR mode and an example Regional mode, which are on opposite ends of the power/performance continuum supported by the transceiver 110.

Referring first to the transmit path, the demultiplexer 402 is configured to communicate with the host 222 using either a 100 GE communication format according to the IEEE standard (for the 100 GE ZR application), or an OTU4 communication format according to the G.709 standard (for the Regional application). In the 100 GE ZR example mode, the data rate at the host 222 is 103.125 Gb/s, the standard Ethernet rate, and the data is transferred across the host interface over 10 lanes at 10.3125 Gb/s per lane, according to the CAUI protocol. In the Regional example mode, the data rate at the host 222 is approximately 111.8 Gb/s including, for example, 99.53 Gb/s of base payload, framing overhead (using e.g., 239/227 scaling), and error correction overhead (using e.g., 255/239 scaling). In the Regional example mode, the incoming data already has error correction provided by the host system. Furthermore, in the Regional example mode, the transceiver 110 uses an OTL4.10 bidirectional interface to the host 222, which has 10 lanes running at 11.18 Gb/s each.

In the example 100 GE ZR mode, the Tx framer/mapper 404 and FEC encoder 406 convert the Ethernet signal at 103.125 Gb/s into an OTU4 signal at 111.8 Gb/s by adding framing and error correction. The FEC encoder 406 uses an 8 dB HD FEC which has lower power than the alternative 11.3 dB SD FEC, but has enough gain for the short reach (80 km) required by the 100 GE ZR application. In the example Regional mode, the incoming OTU4 signal already has framing and error correction, so the Tx framer/mapper 404 is used only for alignment and monitoring, and the FEC encoder 406 is bypassed. From this point forward in the transmit path, the data rate (111.8 Gb/s) and format (OTU4) are the same for both the 100 GE ZR and Regional example modes.

In the example Regional mode, the symbol mapper 412 of the Tx DSP 410 is configured as a DP-QPSK mapper for encoding data for DP-QPSK modulation. The symbol mapper 412 modulates the encoded signal (using DP-QPSK modulation) from the Tx framer/mapper 404 to produce symbols carrying four bits of information per dual-polarized symbol. The modulated symbol rate is approximately 27.95 Gbaud in this example mode and the line rate is 111.8 Gb/s. In different variations of the example Regional mode, the Tx filter 414 and/or non-linear pre-compensation filter 418 may or may not be bypassed.

In the example 100 GE ZR mode, the Tx DSP 410 is configured for dual-polarization 16-level quadrature amplitude modulation (DP-16QAM). The symbol mapper 412 generates a DP-16QAM signal which carries eight bits per dual polarized symbol (instead of four for DP-QPSK). Therefore, the symbol rate is R/8, where R is the line rate (e.g., R=111.8 Gb/s in the example implementation). In an alternative embodiment, Tx DSP 410 may instead be configured to apply a dual-polarization differential 16QAM (DP-D16QAM) encoding and decoding, which similarly results in a symbol rate of R/8. The Tx DSP 410 produces a symbol rate of 13.98 GBaud, which is half the symbol rate of the example Regional mode using DP-QPSK modulation described above. In other variations, different data rates are possible.

The use of 16QAM modulation benefits from sufficient linearity in the optical components to ensure that the symbols in the transmitted constellation (of 16 two-dimensional points per polarization) are evenly spaced. The transfer characteristic of an optical modulator 316 is inherently non-linear (the output optical field varies with the input voltage according to a cosine function). Furthermore, at high data rates (e.g., 100 G or higher), integrated Indium Phosphide (InP) or other low-power, compact optics may not be linear enough on their own to support 16QAM. Thus, in this example 100 GE ZR mode, the Tx DSP 410 utilizes the non-linear pre-compensation block 418 in the Tx DSP 410 to compensate for non-linearities in the optics to ensure evenly spaced points in the optical 16QAM constellation.

In the example Regional mode using DP-QPSK modulation, the DAC 434 may be configured to output one of two output levels (e.g., logic high and logic low) in the case where the Tx filter 414, interpolation filter 416 and non-linear pre-compensation 418 are bypassed. In one embodiment, the DAC 434 samples at exactly twice the symbol rate when the interpolation filter 416 is bypassed in the example Regional mode.

The DAC 434 in the example 100 GE ZR mode is configured to have a fixed point resolution sufficient to enable the DAC 434 to represent the four output levels of the 16QAM modulation, and to represent adjustments to values between the levels introduced by the Tx filter 414 (if used), interpolation filter 416 (if used), and non-linear pre-compensation block 418. In this example 100 GE ZR mode, the DAC 434 is configured as a 4-channel 6-bit DAC. In one embodiment, the DAC 434 sample data received from multiplexer 432 at approximately twice the symbol rate (e.g., at 28.0 GSa/s).

Referring now to the receive paths, in the example Regional mode, the ADC 442 comprises, for example, a 4-channel 55.9 GSa/s ADC that samples at twice the symbol rate. After passing through BCD 454, timing recovery and interpolation block 456 and FFE 458 of the Rx DSP 450, the symbol de-mapper 462 demodulates each dual-polarization symbol into a 4-bit value according to DP-QPSK demodulation. In this example Regional mode, the FEC encoder 406 and decoder 472 are bypassed and error correction is instead performed externally to the transceiver 110 (and externally to the pluggable optical module 108). For example, in one embodiment the error correction is performed in the optical transport network PHY 106 of FIG. 1 and may be implemented, for example, as a low-overhead hard decision FEC.

In the example 100 GE ZR mode, the ADC 442 comprises, for example, a 4-channel 28.0 GSa/s ADC that samples at approximately twice the symbol rate. After passing through BCD 454, timing recovery and interpolation block 456 and FFE 458 of the Rx DSP 450, the symbol de-mapper 462 demodulates each dual-polarization symbol into an 8-bit value according to DP-16QAM demodulation. The FEC decoder 472 then corrects errors in the data using the 8 dB HD FEC.

Comparison of DP-QPSK and DP-16QAM in Example Modes

In the example modes described above, the use of DP-16QAM in the 100 GE ZR example mode results in an optical signal-to-noise ratio (OSNR) penalty relative to using DP-QPSK modulation because of the closer spacing of constellation points. (Though the negative impact of the closer spacing is partially offset by the positive impact of the 50% lower symbol rate for a given data rate.) An OSNR penalty means that a higher OSNR is required to achieve the same bit-error-rate performance. Additionally the use of a lower coding gain internal FEC (versus higher coding gain, and higher power, external HD FEC or higher gain, higher power internal SD FEC) will incur OSNR penalty. However this penalty is acceptable in metro applications because such applications have limited reach (<1000 km) and performance requirements. Thus, these OSNR penalties can be absorbed in a reasonable link budget.

The reduction in symbol rate achieved by using DP-16QAM modulation in, for example, the example 100 GE ZR mode reduces power relative to DP-QPSK modulation in, for example, the example Regional mode described above. This reduction can be realized by reducing the data path bus width for modes using DP-16QAM relative to modes using DP-QPSK. For example, using the same clock rates, the Tx DSP 410 and Rx DSP 450 may have a data path bus width of 64 6-bit samples per channel for modes using DP-16QAM, as compared to 128 6-bit samples per channel for modes using DP-QPSK modulation. Because power scales approximately linearly with bus width, a power savings of about 50% in the Tx and Rx DSP logic is achieved in this example. In an alternative embodiment, a similar power savings could be achieved by reducing the clock rate while maintaining the same data path bus width.

Power savings may also be achieved in modes using DP-16QAM modulation because DP-16QAM allows for a lower sampling rate of the Tx AFE 430 and Rx AFE 440 compared to the same blocks used in modes that use DP-QPSK modulation. Assuming the AFEs sample at twice the symbol rate, a sample rate of about 55.9 GSa/s is achieved in the Regional example mode (using DP-QPSK), while a sample rate of about 28.0 GSa/s is achieved in the 100 GE ZR example mode (using DP-16QAM). The power dissipation of the ADC 442 and DAC 434 are approximately linearly proportional to the sample rate. Therefore, the power savings of the Tx AFE 430 and Rx AFE 440 in mode DP-16QAM using is about 50%. In one embodiment, power can be further reduced in either DP-QPSK or DP-16QAM modes by reducing the sampling rate (e.g., to 1.5× the symbol rate) and then using interpolation in the Tx DSP 410 and/or Rx DSP 450 to reconstruct the samples at the original sampling rate. In another embodiment, the resolution of the samples can be reduced (e.g., 5 bit samples instead of 6 bit samples).

In one embodiment, power savings can furthermore be achieved in a mode using DP-16QAM because the BCD 454 can be bypassed or simplified relative to a mode using DP-QPSK. The complexity of the BCD 454 is related to the length of the impulse response of the chromatic dispersion (CD) in the fiber, which itself is proportional to the square of the symbol rate. For example, the 100 GE ZR example mode applies to 80 km of typical fiber having a CD coefficient of around 17 ps/nm/km. In the Regional example mode (using DP-QPSK), in which the modulated signal bandwidth is approximately 0.3 nm, the length of the CD impulse response would be approximately 80 km×17 ps/nm/km×0.3 nm=408 ps, or 11.4 symbol periods, or 22.8 sample periods. In DP-16QAM, the lower symbol rate reduces the length of the CD impulse response to approximately 11.4/4=2.9 symbol periods or 5.7 sample periods, enabling implementation of the CD compensation function in the FFE 458, and bypassing of the BCD 454. While it also theoretically possible to implement CD compensation in the FFE 458 in DP-QPSK modes, the 4× increase in complexity due to the longer impulse response, on top of the 2× increase in complexity due to the increase in clock rate, may make the power required for such an approach undesirable.

In an application where the the BCD 454 is enabled together with DP-16QAM (such as the Metro Green application in Table 1), power savings are still achieved versus an alternative DP-QPSK implementation according to the same principals described above. For example, according to a similar calculation as above, CD caused by 600 km of typical fiber has an impulse response length of 171 sample periods for DP-QPSK, and 42.8 sample periods for DP-16QAM. In a typical implementation, the fast fourier transform (FFT) block size used to compensate this impulse response may be 256 for DP-QPSK and 64 for DP-16QAM. Given these block sizes, the power savings in the BCD 454 for DP-16QAM versus DP-QPSK would be around 25%, because FFT complexity scales as the log base 2 of block size. This power savings is on top of the 50% power savings in the BCD 454 due to reduced symbol rate (as described above), for a total 62.5% power savings in the BCD 454 resulting from the use of DP-16QAM.

Modes using DP-16QAM also enable use of an FFE 458 having reduced complexity relative to modes using DP-QPSK. The FFE 458 is primarily used to compensate polarization mode dispersion (PMD). The complexity/power of the FFE 458 is linearly related to the length of the PMD impulse response, which itself is linearly related to symbol rate. For example, in the case of 100 ps of first-order PMD tolerance, a mode using DP-QPSK may yield a first-order PMD tolerance of approximately 3.2 symbol periods or 6.4 sample periods. However, in a mode using DP-16QAM, a first-order PMD tolerance of approximately 1.4 symbol periods or 2.8 sample periods is achieved. Practically speaking, the FFE should be longer than the PMD impulse response, and may be, for example, 16 (matrix) taps in a DP-QPSK mode and 8 (matrix) taps in a DP-16QAM mode. This results in a power savings of 50% in the FFE 458, on top of the 50% power savings in the FFE 458 due to reduced symbol rate (as described above), for a total 75% power savings in the FFE 458 resulting from the use of DP-16QAM.

Additional Configurations

In alternative embodiments, features of the transmit path of the transceiver described above can also apply to a standalone transmitter. Similarly, features of the receive path of the transceiver described above can also apply to a standalone receiver.

Furthermore, any of the application modes described above may instead be implemented in a transceiver device (or a standalone transmitter or receiver device) that is not necessarily programmable. For example, the 100 GE ZR example mode described above (or other described transceiver configurations) may instead be implemented in a transceiver that is pre-configured to carry out the described functions of this example mode and is not necessarily programmable. This approach would enable the manufacture of the transceiver in a smaller silicon area (based on removal of unused features) and hence at a lower cost.

Figure 6:
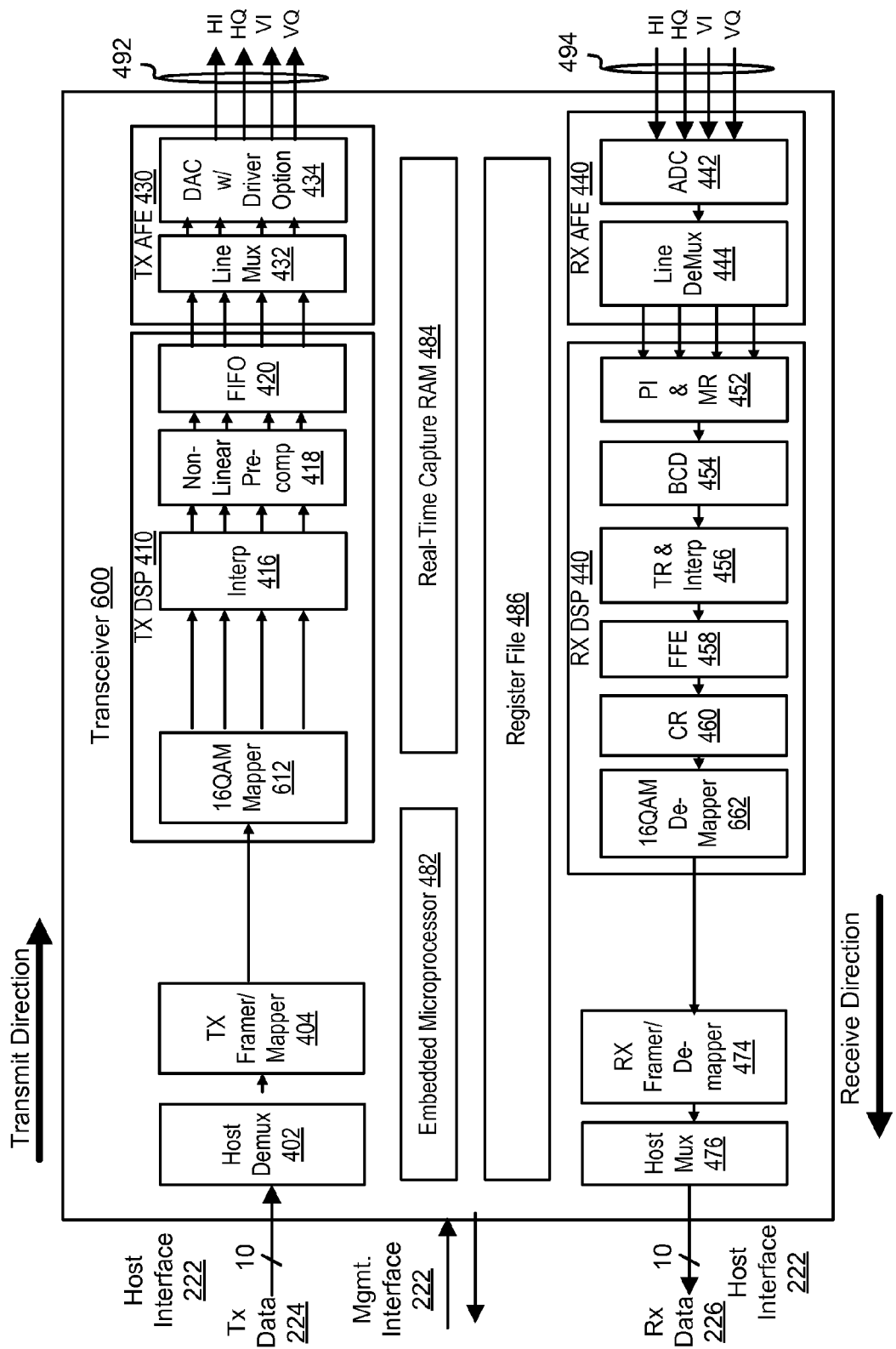
FIG. 6 is a block diagram of an embodiment of a quadrature amplitude modulation (QAM) transceiver suitable for an optical communication system.

FIG. 6 illustrates an example architecture of a transceiver 600 pre-configured for DP-16QAM and suitable for applications such as the 100 GE ZR application described above. As can be seen, the transceiver 600 is similar to the programmable transceiver 110 described above but lacks FEC encoder 406 and FEC decoder 472, and replaces symbol mapper 412 and symbol de-mapper 462 with specialized 16QAM mapper 612 and 16QAM de-mapper 662 respectively. Furthermore, various other blocks of the transceiver 600 may be pre-configured in the manner described above for use with the 100 GE ZR application (or may have a limited number of programmable options). An advantage of the specialized transceiver architecture of FIG. 6 is that it can achieve the benefits associated with 16QAM operation described above using less silicon and at lower cost relative to the programmable transceiver 110.

Although the detailed description contains many specifics, these should not be construed as limiting the scope but merely as illustrating different examples and aspects of the described embodiments. It should be appreciated that the scope of the described embodiments includes other embodiments not discussed in detail above. For example, the functionality of the various components and the processes described above can be performed by hardware, firmware, software, and/or combinations thereof.

Various other modifications, changes and variations which will be apparent to those skilled in the art may be made in the arrangement, operation and details of the method and apparatus of the described embodiments disclosed herein without departing from the spirit and scope of the invention as defined in the appended claims. Therefore, the scope of the invention should be determined by the appended claims and their legal equivalents.

The invention claimed is:

1. A method for operating an optical communication system, the method comprising:
 receiving, by a fabric interface, an input data signal from a host device;
 mapping and framing, by a physical layer processor, the input data signal into a digital transmit signal;
 receiving, by a digital interface of a transmitter circuit configurable in a plurality of different application modes having at least a first application mode and a second application mode, the digital transmit signal from the physical layer processor at a given bit rate;
 generating, by a digital signal processor (DSP), a modulated signal vector based on the digital transmit signal;
 wherein generating the modulated signal vector includes encoding, by a symbol mapper of the DSP, the digital transmit signal to generate the modulated signal vector;
 wherein generating the modulated signal vector includes generating the modulated signal vector according to a first modulation scheme at a first symbol rate at the given bit rate when configured in the first application mode;

wherein generating the modulated signal vector includes generating the modulated signal vector according to a second modulation scheme at a second symbol rate at the given bit rate when configured in the second application mode;

wherein the second symbol rate is different from the first symbol rate and the second modulation scheme is characterized by a different number of bits per symbol than the first modulation scheme;

generating, by an analog front end having a digital-to-analog converter (DAC), an analog signal vector based on the modulated signal vector; and converting, by an optical module, the analog signal vector to an optical signal suitable for transmission over an optical network.

2. The method of claim 1 further comprising storing, by a memory, an application mode table, each entry of the application mode table being associated with a different one of the plurality of predefined application modes; and storing, by the application mode table, an association between the given application mode and configuration settings for one or more programmable blocks of the DSP, the analog front end, and the digital interface.

3. The method of claim 1 wherein generating the modulated signal vector includes modulating, by the DSP, the digital transmit signal according to a quadrature phase shift keying (QPSK) modulation scheme while in the first application mode; and wherein generating the modulated signal vector includes modulating, by the DSP, the digital transmit signal according to a quadrature amplitude modulation (QAM) scheme while in the second application mode.

4. The method of claim 3 wherein encoding the digital transmit signal includes encoding, by a QAM encoder operational in the second application mode, the digital transmit signal according to the QAM modulation scheme to generate a QAM signal vector; and filtering, by a non-linear pre-compensation block of the DSP operational in the second application mode, the QAM signal vector to compensate for non-linearities in the optical communication system and the optical network.

5. The method of claim 3 wherein generating the modulated signal vector includes generating the modulated signal vector by the DSP operating with a reduced symbol rate in the second application mode relative to the first application mode for the given bit rate, the reduced symbol rate causing the DSP to operate with lower power in the second application mode relative to the first application mode.

6. The method of claim 3 wherein generating the analog signal vector includes performing, by a programmable analog front end of the analog front end, one of the following:
(1) applying a full sampling rate when the DSP is configured in the first application mode that applies the QPSK modulation scheme; and
(2) applying a half sampling rate when the DSP is configured in the second application mode that applies the QAM modulation scheme.

7. The method of claim 1 wherein generating the analog signal vector includes performing, by a programmable analog front end of the analog front end, one of the following:
(1) generating the analog signal vector suitable for directly driving an optical modulator in a first configuration of the analog front end; and
(2) generating the analog signal vector suitable for controlling a driver that drives the optical modulator in a second configuration of the analog front end.

8. The method of claim 7 wherein the optical modulator is copackaged with the transmitter circuit; and wherein generating the analog signal vector includes directly driving, by the programmable analog front end, the optical modulator while in the first configuration.

9. The method of claim 1 further comprising encoding, by a programmable forward error correction (FEC) encoder, the digital transmit signal for error correction; wherein encoding the digital transmit signal includes performing, by the FEC encoder, one of the following:
(1) a hard decision encoding;
(2) a soft decision encoding;
(3) a standard G.709 encoding; and
(4) no error correction encoding.

10. A method of operating an optical communication system, the method comprising:

converting, by an optical module, an optical signal received over an optical network to an analog signal vector;

receiving, by an analog front end of a receiver circuit configurable in a plurality of different application modes having at least a first application mode and a second application mode, the analog signal vector;

generating, by an analog-to-digital converter (ADC) of the analog front end, a digital signal vector based on the analog signal vector, the ADC being configurable to operate at different sampling rates in the different application modes;

generating, by a digital signal processor (DSP) of the analog front end, a demodulated signal vector based on the digital signal vector at a given bit rate;

wherein generating the demodulated signal vector includes decoding, by a symbol de-mapper of the DSP, the digital transmit signal vector to generate the demodulated signal vector;

wherein generating the demodulated signal vector includes generating the demodulated signal vector according to a first demodulation scheme at a first symbol rate at the given bit rate when configured in the first application mode;

wherein generating the demodulated signal vector includes generating the demodulated signal vector according to a second demodulation scheme at a second symbol rate at the given bit rate when configured in the second application mode;

wherein the second symbol rate is different from the first symbol rate and the second demodulation scheme is characterized by a different number of bits per symbol than the first demodulation scheme;

outputting, by a digital interface, the demodulated signal vector at the given bit rate;

receiving, by a physical layer processor, the demodulated signal vector from the digital interface;

de-mapping and de-framing, by the physical layer processor, the demodulated signal vector into a received data signal; and transmitting, by a fabric interface, the received data signal to a host device.

11. The method of claim 10 further comprising storing, by a memory, an application mode table, each entry of the application mode table being associated with a different one of the plurality of predefined application modes; and storing, by the application mode table, an association between the given application mode and configuration settings for one or more programmable blocks of the DSP, the analog front end, and the digital interface.

12. The method of claim 10 wherein generating the demodulated signal vector includes demodulating, by the DSP, the digital signal vector according to a quadrature phase shift keying (QPSK) modulation scheme while in the first application mode; and wherein generating the demodulated signal vector includes demodulating, by the DSP, the digital signal vector according to a quadrature amplitude modulation (QAM) scheme while in the second application mode.

13. The method of claim 12 wherein generating the demodulated signal vector includes generating the demodulated signal vector by the DSP operating with a reduced symbol rate in the second application mode relative to the first application mode for the given bit rate, the reduced symbol rate causing the DSP to operate with lower power in the second application mode relative to the first application mode.

14. The method of claim 12 wherein generating the digital signal vector includes performing, by a programmable analog front end of the analog front end, one of the following:
  (1) applying a full sampling rate when the DSP is configured in the first application mode that applies the QPSK modulation scheme; and
  (2) applying a half sampling rate when the DSP is configured in the second application mode that applies the QAM modulation scheme.

15. The method of claim 12 wherein generating the digital signal vector includes applying, by a carrier recovery block of the analog front end, a blind phase search (BPS) carrier recovery algorithm when the DSP is configured in the second application mode that applies the QAM demodulation scheme.

16. The method of claim 10 further comprising decoding, by a programmable forward error correction (FEC) decoder, the demodulated signal vector for error correction; wherein decoding the demodulated signal vector includes performing, by the FEC decoder, one of the following:
  (1) a hard decision decoding;
  (2) a soft decision decoding;
  (3) a standard G.709 decoding; and
  (4) no error correction decoding.

17. The method of claim 10 wherein generating the demodulated signal vector includes generating, by the DSP having a programmable feed-forward equalizer having a programmable number of filter taps.

18. The method of claim 17 wherein generating the demodulated signal vector includes shutting off or clock-gating, by the programmable feed-forward equalizer, a plurality of filter taps not being used in the given application mode, thereby reducing power of the DSP.

19. The device of claim 10 wherein generating the demodulated signal vector includes filtering, by a programmable bulk chromatic dispersion (BCD) compensation filter, the digital signal vector; wherein the programmable BCD compensation filter is configured in (1) a first configuration capable of compensating for up to a first level of chromatic dispersion, and (2) a second configuration capable of compensating for up to a second level of chromatic dispersion higher than the first level; wherein the programmable BCD compensation filter consumes less power in the first configuration than in the second configuration.

20. A method for operating an optical communication system, the method comprising:
  receiving an input data signal from a host device;
  converting, by a physical layer processor, the input data signal into a digital transmit signal;
  receiving, by a digital interface configurable in a plurality of different application modes having at least a first application mode and a second application mode, the digital transmit signal from the physical layer processor at a given bit rate;
  generating, by a digital signal processor (DSP), a modulated signal vector based on the digital transmit signal;
  wherein generating the modulated signal vector includes encoding, by a symbol mapper of the DSP, the digital transmit signal to generate the modulated signal vector;
  wherein generating the modulated signal vector includes generating the modulated signal vector according to a first modulation scheme at a first symbol rate at the given bit rate when configured in the first application mode;
  wherein generating the modulated signal vector includes generating the modulated signal vector according to a second modulation scheme at a second symbol rate at the given bit rate when configured in the second application mode;
  wherein the second symbol rate is different from the first symbol rate and the second modulation scheme is characterized by a different number of bits per symbol than the first modulation scheme;
  converting, by an optical module, an optical signal received over an optical network to an analog signal vector;
  receiving, by an analog front end configurable in a plurality of different application modes having at least the first application mode and the second application mode, the analog signal vector;
  generating, by an analog-to-digital converter (ADC) of the analog front end, a digital signal vector based on the analog signal vector, the ADC being configurable to operate at different sampling rates in the different application modes; and
  generating, by the DSP, a demodulated signal vector based on the digital signal vector at a given bit rate;
  wherein generating the demodulated signal vector includes decoding, by a symbol de-mapper of the DSP, the digital transmit signal vector to generate the demodulated signal vector;
  wherein generating the demodulated signal vector includes generating the demodulated signal vector according to a first demodulation scheme at the first symbol rate at the given bit rate when configured in the first application mode;
  wherein generating the demodulated signal vector includes generating the demodulated signal vector according to a second demodulation scheme at the second symbol rate at the given bit rate when configured in the second application mode;
  wherein the second demodulation scheme is characterized by a different number of bits per symbol than the first demodulation scheme.

* * * * *